(12) United States Patent
Dwyer et al.

(10) Patent No.: US 6,874,056 B2
(45) Date of Patent: Mar. 29, 2005

(54) METHOD AND APPARATUS FOR REDUCING CACHE THRASHING

(75) Inventors: Harry Dwyer, Annandale, NJ (US); John Susantha Fernando, Coopersburg, PA (US)

(73) Assignee: Agere Systems Inc., Allentown, PA (US)

( * ) Notice: Subject to any disclaimer, the term of this patent is extended or adjusted under 35 U.S.C. 154(b) by 373 days.

(21) Appl. No.: 09/975,762

(22) Filed: Oct. 9, 2001

(65) Prior Publication Data

US 2003/0070045 A1 Apr. 10, 2003

(51) Int. Cl.⁷ .............................................. G06F 12/00
(52) U.S. Cl. ............................ 711/3; 711/128; 711/209
(58) Field of Search .............................. 711/3, 128, 209

(56) References Cited

U.S. PATENT DOCUMENTS

| | | | | |
|---|---|---|---|---|
| 5,630,097 A | * | 5/1997 | Orbits et al. ................. | 711/165 |
| 5,752,261 A | * | 5/1998 | Cochcroft, Jr. .............. | 711/133 |
| 6,115,793 A | * | 9/2000 | Gruber et al. ............... | 711/133 |
| 6,154,812 A | * | 11/2000 | Hetherington et al. ...... | 711/122 |
| 6,625,695 B2 | * | 9/2003 | Fanning ....................... | 711/134 |
| 2002/0099912 A1 | * | 7/2002 | Nakamura et al. .......... | 711/119 |

OTHER PUBLICATIONS

Kaxiras et al, "Cache Decay: Exploiting Generational Behavior to Reduce Cache Leakage Power," IEEE, (2001).
Lai et al., "Dead–Block Prediction & Dead–Block Correlating Prefetchers," IEEE, (2001).
Mendelson et al, "Modeling Live and Dead Lines in Cache Memory System," IEEE, Trans. on Computers, v. 42, No. 1, (Jan. 1993).

* cited by examiner

*Primary Examiner*—Jack A. Lane

(57) ABSTRACT

A method and apparatus are disclosed for adaptively decreasing cache trashing in a cache memory device. Cache performance is improved by automatically detecting thrashing of a set and then providing one or more augmentation frames as additional cache space. In one embodiment, the augmentation frames are obtained by mapping the blocks that map to a thrashed set to one or more additional, less utilized sets. The disclosed cache thrashing reduction system initially identifies a set that is likely to be experiencing thrashing, referred to herein as a thrashed set. Once thrashing is detected, the cache thrashing reduction system selects one or more additional sets to augment a thrashed set, referred to herein as the augmentation sets. In this manner, blocks of main memory that are mapped to a thrashed set are now mapped to an expanded group of sets (the thrashed set and the augmentation sets). Finally, when the augmentation sets are no longer likely to be needed to decrease thrashing, the augmentation set(s) are disassociated from the thrashed set(s).

30 Claims, 4 Drawing Sheets

METHOD AND APPARATUS FOR REDUCING CACHE THRASHING

FIELD OF THE INVENTION

The present invention relates generally to cache memory devices, and more particularly, to methods and apparatus for adaptively decreasing cache trashing in a cache memory device.

BACKGROUND OF THE INVENTION

Processors often use a cache to improve performance and decrease system costs. Caches temporarily store recently accessed information (blocks of instructions or data) in a small memory that is faster to access than a larger main memory. Caches are effective because a block that has been accessed once is likely to be accessed soon again or is often near a recently accessed block. Thus, as a task executes, the working set of a task (the instructions and data currently required for the task) is stored in the cache in the event that the information may be accessed again. A cache typically maps multiple blocks of information from the main memory into one place in a cache, typically referred to as a "set." A "block" refers to the minimum unit of information that can be present in a cache and a "frame" is the place in a cache where a single block may be stored. In a set associative cache, multiple frames are grouped into sets. For example, as two-way set associative cache has two frames in each set.

Index bits in the address of a block of main memory select a set to hold the block in the cache. The index bits thus associate (map) a block to a cache set. Any of the frames in the set may hold a block that maps to the set. When a new block is stored in a set, it is typically stored in the least recently accessed frame of the set. A block that currently resides in the frame (if any) is evicted from the cache. A cache directory is typically used to determine if a given block is in the cache. The directory is often a table of entries, one entry for each set in the cache. An entry contains one field for each frame in its associated set. To determine if a block is in the cache, the corresponding index bits are used to select a directory entry. If a given block is in the cache, the address of the block is in one of the entry's frame fields.

The index bits specify the set that holds the block in the cache. Thus, all blocks with the same index map to the same set. If there are not enough frames in a set to store all the blocks that map to the set that are currently in use by a program, one or more frames must be evicted prematurely (i.e., before temporally local accesses to them have completed), thereby increasing cache misses. This phenomenon is referred to as "thrashing" and can significantly decrease cache performance. A need therefore exists for an adaptive mechanism to decrease cache trashing in a cache memory device. A further need exists for a mechanism for extending a cache set when such thrashing occurs.

SUMMARY OF THE INVENTION

Generally, a method and apparatus are disclosed for adaptively decreasing cache trashing in a cache memory device. The present invention improves performance of a cache by automatically detecting thrashing of a set and then providing one or more augmentation frames as additional cache space. In one embodiment, the augmentation frames are obtained by mapping the blocks that map to a thrashed set to one or more additional, less utilized sets.

The disclosed cache thrashing reduction system initially identifies a set that is likely to be experiencing thrashing, referred to herein as a thrashed set. Once thrashing is detected, the cache thrashing reduction system selects one or more additional sets to augment a thrashed set, referred to herein as the augmentation sets. In this manner, blocks of main memory that are mapped to a thrashed set are now mapped to an expanded group of sets (the thrashed set and the augmentation sets). Finally, when the augmentation sets are no longer likely to be needed to decrease thrashing, the augmentation set(s) are disassociated from the thrashed set(s).

Thrashed set detection may be based, for example, on the individual miss rate of a set, the miss rate of a set relative to other sets, the addresses of the blocks involved in misses on the set, or a combination of the foregoing. An exemplary approach assumes that a set that is experiencing a high miss rate may be experiencing thrashing. In one implementation, a miss counter and an access counter are associated with one or more sets. The accesses of a given set are counted and the miss rate is determined by comparing the number of misses experienced during a given number of accesses. A reduction in logic may be achieved by counting accesses to a group of sets, such as set pairs, rather than to individual sets. In a further variation, only the misses and accesses relative to sets that have recently experienced a miss are counted.

Thrashing is reduced on a set in accordance with the present invention by selecting one or more additional sets (augmentation sets) in the cache to share their space with the thrashed set. The augmentation sets may be selected, for example, based on a low access rate, a position in the address space relative to a thrashed set or their miss rate, using a static assignment, a wired-in assignment or by other means. When a given set augments a thrashed set, it shares its space with the thrashed set. In a unidirectional augmentation approach, some blocks that formerly mapped to the thrashed set now map to an augmentation set and blocks that previously mapped to the augmentation set continue to do so. In a bidirectional augmentation approach, the blocks that map to either the thrashed set or to the augmentation set are distributed across both sets. That is, some blocks that previously mapped to the thrashed set now map to the augmentation set and some blocks that previously mapped to the augmentation set now map to the thrashed set. In one exemplary implementation, augmentation set(s) are selected based on a cache index of a set relative to that of a thrashed set.

There are a number of ways to map some of the blocks mapped to a thrashed set to an augmentation set (to couple the augmentation set to the thrashed set). Generally, coupling should ensure that blocks that are thrashing would be mapped in approximately equal numbers to the thrashed set and to the augmentation set. An exemplary concurrent symmetric static-pairs coupling approach is disclosed where each set in a pair is the augmentation set for the other and if thrashing is detected on either set, both sets share blocks mapped to them with the other set. In non-concurrent versions, the thrashed set shares blocks mapped to it with an augmentation set but the augmentation set would not share its blocks with the thrashed set.

According to a further aspect of the present invention, a mechanism is disclosed for releasing an augmentation set from the map of a thrashed set, when appropriate. While a larger cache may help to decrease thrashing, this entails a larger directory and applies additional space everywhere, whereas space is actually needed only in specific places for limited amounts of time. The additional area of a larger cache is apt to be greater than that consumed by the anti-thrashing logic of the present invention. The present invention effectively enhances cache performance by selectively augmenting over-utilized cache space with under-utilized space, when needed.

A more complete understanding of the present invention, as well as further features and advantages of the present invention, will be obtained by reference to the following detailed description and drawings.

DETAILED DESCRIPTION

Figure 1:
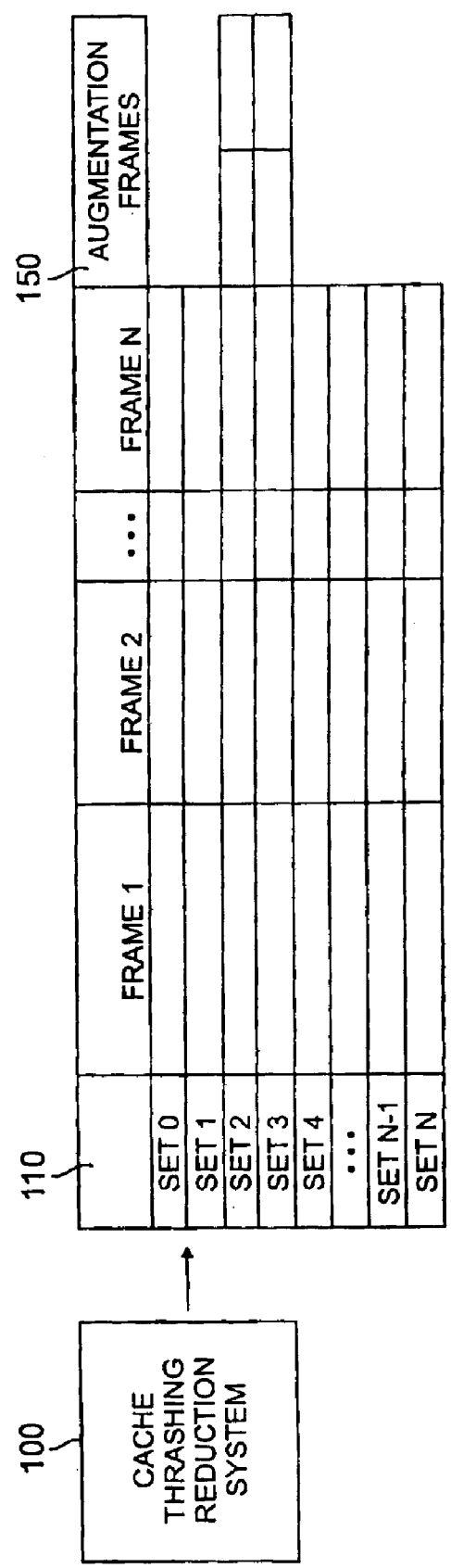
FIG. 1 illustrates a cache thrashing reduction system in accordance with the present invention.

FIG. 1 illustrates a cache thrashing reduction system 100 in accordance with the present invention. The present invention improves performance of an N-way associative cache 110 by automatically detecting thrashing in a set, such as sets 2 and 3, and then reducing thrashing in the thrashed set(s) by providing one or more augmentation frames 150 as additional cache space. In this manner, the thrashed sets can remain in the cache longer, improving their hit rate. The augmentation frames 150 are obtained, for example, by mapping the blocks that map to a thrashed set to one or more additional, less utilized sets. While the present invention is illustrated with a two-way set associative instruction cache that has two frames at each set address, the present invention may be incorporated into all cache organizations (data or instruction), as would be apparent to a person of ordinary skill in the art. The cache thrashing reduction system 100 and cache 110 can be part of a digital signal processor (DSP), microcontroller, microprocessor, application specific integrated circuit (ASIC) or another integrated circuit.

Detection of Thrashed Sets

Thrashed set detection may be based on the individual miss rate of a set, its miss rate relative to other sets, the addresses of the blocks involved in misses on the set, or a combination of the foregoing. These approaches employ increasingly complex logic and are not all explored here. An exemplary approach is based on an assumption that a set that is experiencing a high miss rate may be experiencing thrashing. Two approaches to thrashing detection are presented that are based on this assumption. The first approach uses more logic than the second approach and is oriented toward caches that are highly associative (four or more frames per set), while the second approach uses less logic and is oriented toward caches that are less associative, or when cost and area are important design criteria.

First Detection Approach

The first approach, discussed further below in conjunction with FIG. 2, associates a miss counter 210 and an access counter 220 with one or more sets. The accesses of a given set are counted and the miss rate is determined by comparing the number of misses experienced during a given number of accesses. However, this implementation may require more logic than is desirable.

Figure 2:
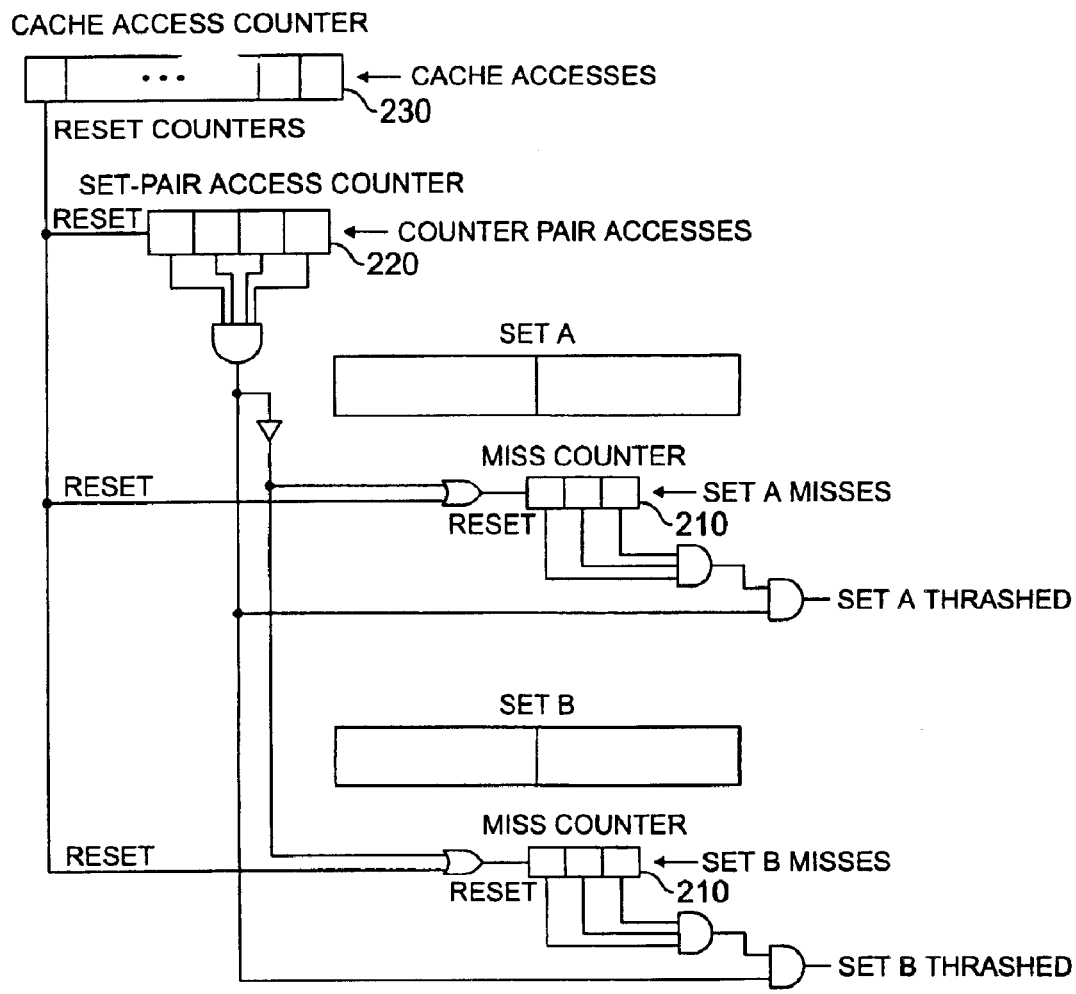
FIG. 2 illustrates a thrashed set detector in accordance with a first exemplary embodiment of the present invention.

A reduction in logic is achieved by counting accesses to a group of sets rather than to individual sets, as shown in FIG. 2. For example, sets may be grouped into pairs and accesses to either set in a pair (counter-pairs) may be counted. Sets may be paired, for example, by their set indexes. For example, a "pair-index" may be derived from a set-index by ignoring its least significant bit and sets with the same pair-index are paired. Sets in these counter-pairs hold contiguous blocks (if set indexes are derived from contiguous address bits). Thus, they are more apt to experience similar access rates than sets paired by other means.

Assume that accesses to counter-pairs are counted by pair-access-counters 220 that are four-bit counters, which wrap to 0x0 after reaching 0xF. The value 0xF is thus achieved by the counter 220 every 16 accesses. When this occurs, the values in the miss-counters 210 of the sets in the counter-pair are examined and then reset to zero. Assume that a miss-counter 210 is a three-bit counter that counts to seven and then saturates. If all bits of the miss-counter 210 are binary ones when examined, the associated set is assumed to be experiencing thrashing. During the last 16 accesses to the set-pair, the set experienced seven misses. Depending on the distribution of accesses between the two sets in the pair, the set experienced a hit rate between 0% (if it experienced seven accesses) to 44% (if it experienced 16 accesses). If the sets experienced equal numbers of accesses, i.e., eight each, the hit rate of the set is 12%. A low hit rate in this range indicates probable thrashing.

In addition to the miss counters 210 (one per set), and counter-pair access counters 220 (one for two sets), there is a cache access counter 230 to count accesses to the entire cache. This counter 230 produces periodic signals that query thrashed set detection logic and reset counters associated with the sets. The logical function of the first approach for thrashed set detection is illustrated in FIG. 2 for a counter-pair, A and B.

Second Detection Approach

The first approach employs a significant number of counters to detect a thrashed set. In some cache implementations, an approach that uses less logic may be desirable. In the following approach, only the misses and accesses relative to sets that have recently experienced a miss are counted. This significantly decreases the logic associated with thrashed set detection compared to the first approach, which counts the misses for each set in the cache.

Figure 3:
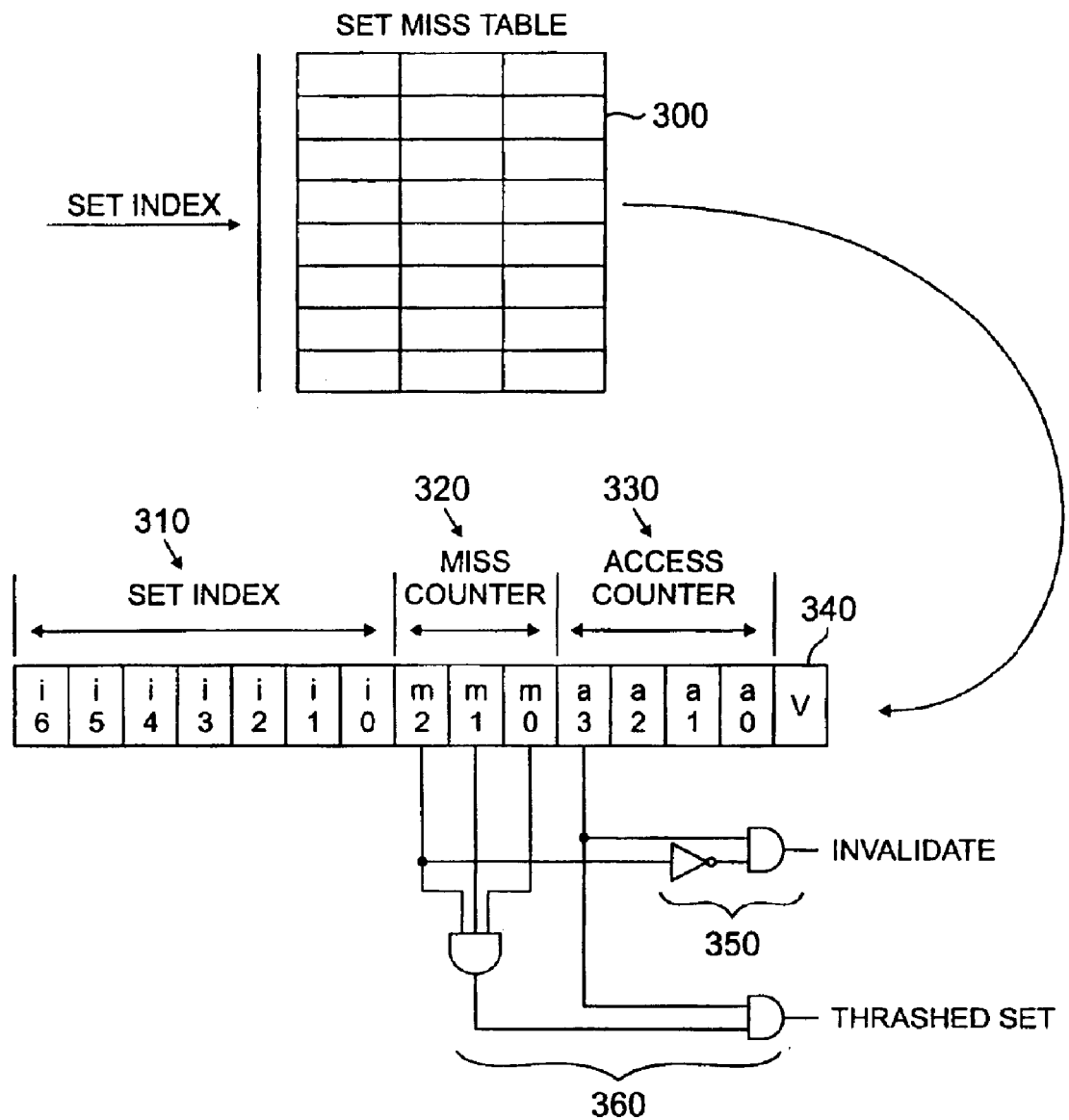
FIG. 3 is a sample set miss table that contains information about the sets that recently experienced misses.

Variations of this approach are possible. One exemplary implementation is presented here to illustrate the technique. FIG. 3 is a sample set miss table (SMT) 300 that contains information about the sets that recently experienced misses, one entry per set. For purposes of illustration, the SMT 300 discussed below has eight entries, one for each of the last eight sets to experience a miss. Each entry in the table 300 is comprised of a set index field 310 that records a cache index of a set, a miss counter 320, an access counter 330, and a valid bit 340. Entries invalidate themselves periodically under certain conditions, making room in the table for new entries.

The operation of the SMT 300 is illustrated using a cache that has 128 sets, with 7-bits in a set index. Also assume that set miss counters are three-bit counters and that set access counters are four-bit counters. The exemplary SMT 300 may be implemented as a content addressable memory (CAM) that is accessed with a set index. When a set is accessed, the SMT 300 is queried to determine if the set's index is in one of the entries in the SMT 300. If the set index is in the SMT 300, and the set experiences a cache hit, the access counter 330 for the associated entry is incremented. If the set is in the SMT 300 and the set experiences a cache miss, the entry's miss and access counters 320, 330, respectively, are incremented. These counters 320, 330 saturate at their maximum value. If the set is not in the SMT 300 and the set experiences a hit, no action occurs.

If the set is not in the SMT 300 and a miss is experienced, the set's index is recorded in an invalid SMT entry if there is one. Entries may invalidate themselves under specified conditions. In this example, an entry invalidates itself if three or fewer misses occur over the last eight or more accesses. The logic 350 for this self-invalidation is shown in FIG. 3. If there are no invalid entries in the SMT 300, the least recently accessed entry is used for the new entry and its previous contents are overwritten.

If, after an access, an entry finds that it has had eight or more misses in the last eight or more accesses, a thrashed set signal is activated using logic 360. In this case, its hit rate is, at most, 50% and may be less. The thrashed set signal initiates the augmentation of the set with one or more other sets. The logic 360 for this approach is illustrated in FIG. 3.

Selection and Acquisition of Augmentation Sets

To decrease thrashing on a set, one or more additional sets in a cache may be selected dynamically or assigned statically to share their space with the thrashed set. These sets may be selected, e.g., on the basis of a low access rate, their position in the address space relative to a thrashed set or their miss rate, using a static assignment, a wired-in assignment or by other means. When a given set augments a thrashed set, it shares its space with the thrashed set. In a unidirectional augmentation approach, some blocks that formerly mapped to the thrashed set now map to an augmentation set and blocks that previously mapped to the augmentation set continue to do so. In a bidirectional augmentation approach, the blocks that map to either the thrashed set or to the augmentation set are distributed across both sets. That is, some blocks that previously mapped to the thrashed set now map to the augmentation set and some blocks that previously mapped to the augmentation set now map to the thrashed set.

In an exemplary implementation of a mechanism to select the augmentation set(s), selection is based on a set's cache index relative to that of a thrashed set. In this approach, a thrashed set is augmented with one set (the augmentation set) when appropriate. The additional set is identified by its index relative to that of the thrashed set. The index of the selected augmentation set is that of the thrashed set with the most significant index bit inverted. For example, if the index of the thrashed set is a binary value of "1111111," the index of the corresponding augmentation set is "0111111." The advantage of this approach is that it is static (and may be wired in) and is relatively easy to implement. Of course, the disadvantage is that the statically assigned augmentation set may not be the best choice of sets to serve this purpose. Decreased effectiveness is traded for increased implementation simplicity. This approach is referred to as the "static-pairs" approach with a set and its potential augmentation set comprising each pair.

At least two versions of the static-pairs approach are possible. In one variation, each set in the pair may act as an augmentation set for the other. In another variation, one set (A) in a pair may augment the other set (B), but set B may not augment set A. The first approach is referred to as symmetric static-pairs, and the second approach is referred to as asymmetric static-pairs.

An improved, albeit more complex, approach is one in which a group of sets are statically assigned to each set, to act as a pool of sets from which an augmentation set is selected. This is approach is referred to as the "static-group" approach. The set with the lowest access rate or lowest miss rate in the static group may be selected as the augmentation set. Other, dynamic approaches may be envisioned, such as dynamic-pairs and dynamic-group approaches, in which an augmentation set is selected from a group of sets whose membership is dynamic.

Mapping Thrashed Blocks to Augmentation Sets

There are many ways to map some of the blocks mapped to a thrashed set to an augmentation set (to couple the augmentation set to the thrashed set). Approaches are strongly influenced by the method used to select augmentation sets. Coupling should insure that blocks that are thrashing would be mapped in equal numbers to the thrashed set and to the augmentation set. However, this approach requires extensive logic that may involve recording the addresses of the blocks that are thrashing. A simpler approach is presented below.

The coupling approach presented is referred to as the concurrent symmetric static-pairs approach because each set in a pair is the augmentation set for the other and if thrashing is detected on either set, both sets share blocks mapped to them with the other set. In non-concurrent versions, the thrashed set shares blocks mapped to it with an augmentation set but the augmentation set would not share its blocks with the thrashed set. An implementation of the concurrent approach is shown in FIG. 4.

Figure 4:
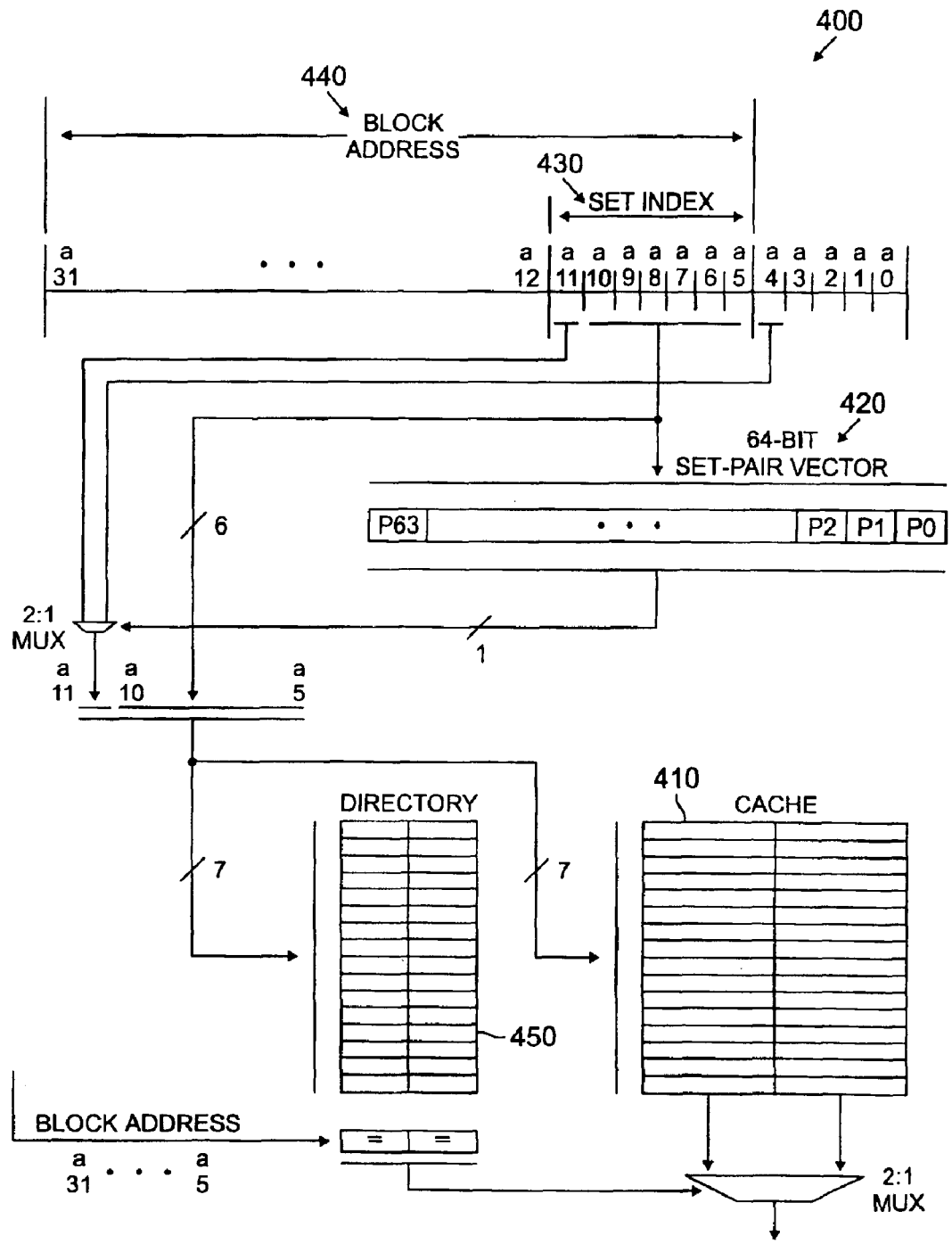
FIG. 4 is a schematic block diagram of an exemplary implementation of a concurrent symmetric static-pairs scheme for coupling a thrashed set and an augmentation set.

FIG. 4 is a schematic block diagram of an exemplary implementation of a concurrent symmetric static-pairs coupling scheme 400. The exemplary cache 410 has 128 sets, or 64 set-pairs. The mechanism 400 has a 64-bit set-pair vector 420 that contains a bit for each set-pair. A bit in this vector 420 is selected with a set-pair index that is derived from a set index 430 as shown in FIG. 4. A binary value of "one" in the set-pair vector 420 specifies that the corresponding set-pair is thrashed and a binary value of "zero" specifies that the set-pair is not thrashed. An appropriate bit is set in this vector 420 when thrashing is detected (a "1") and when augmentation is no longer desired (a "0").

Suppose that the cache 410 is accessed with a block address 440 and that its set-pair index 430 selects a true bit in the set-pair vector 420. In this case, a low order bit in the block address 440 (a4 in this implementation) is substituted for the high order bit of the set index 430. This causes some blocks that previously mapped to one of the sets in the pair to be mapped to the other set. This very simple logic decreases the thrashing in the set, improving the hit rate.

A cache directory 450 is accessed with the modified index, but a block's unmodified address is always held in the directory 450. During an access, a block's unmodified address is compared with that held in the directory 450 as shown in FIG. 4. In this way, correct data is accessed before, during and after changes in the mapping of blocks to sets, with the exception of write back caches.

Write-Back Caches

The above approach works in instruction caches and write-through caches. If however, a set may contain data that has been written into it and is not reflected in main memory, a problem arises when a map is changed. An access involving a block that has been altered in the cache may miss using an altered map, resulting in incorrect data being retrieved from main memory. Therefore, if the present invention is employed in a write-back cache, either a set that contains an altered block (dirty block) may not be remapped, or the dirty block that it contains must be written back to main memory before the map is altered.

Releasing Augmentation Sets When No Longer Needed

There are a number of circumstances when an augmentation set 150 should be removed from the map of a thrashed set ("unmapped"), when appropriate. A first circumstance occurs when the augmentation set becomes a thrashed set while it supports a thrashed set. Unless a symmetric static-pairs augmentation set assignment approach is used, the augmentation set should be unmapped. Thrashing of the augmentation set is detected in the same way that the thrashed set was detected.

A second circumstance occurs when the augmentation set is no longer needed, i.e., the thrashed set is no longer being thrashed. The determination that an augmentation set is no longer necessary is difficult. It may be desirable to differentiate between two situations: 1) thrashing has been decreased or eliminated, but the augmentation set is still necessary, and, 2) thrashing is not likely to occur if the augmentation set is unmapped. One approach is to establish a minimum number of cache accesses (access period) for which a set is augmented. If the set is no longer thrashing at the end of the access period, the augmentation set is unmapped. If the second detection approach is used, for example, when a set is augmented, its entry in the SMT 300 may be invalidated. If the set continues to experience thrashing, the thrashed set will again be augmented during the following period; if not, its augmentation is discontinued.

A third possible circumstance for unmapping the augmentation set is when the augmentation set is ineffective in decreasing thrashing in the thrashed set. One approach is to unmap the augmentation set if a thrashed set continues to thrash after it is augmented. This is the simplest approach but it may not be desirable if thrashing decreases after a thrashed set is augmented but still occurs at some level. The degree to which thrashing is decreased may be determined with appropriate logic if desired.

It is to be understood that the embodiments and variations shown and described herein are merely illustrative of the principles of this invention and that various modifications may be implemented by those skilled in the art without departing from the scope and spirit of the invention.

We claim:

1. A cache memory, comprising:
    a plurality of sets of cache frames for storing information from main memory;
    a thrashing detector for determining when one or more of said sets are a thrashed set; and
    a selector for identifying one or more additional frames to augment said thrashed set, wherein said one or more additional frames and said thrashed set are at the same memory hierarchical level as said cache.

2. The cache memory of claim 1, wherein said thrashing detector evaluates a miss rate of a set.

3. The cache memory of claim 2, wherein said thrashing detector further comprises a miss counter and an access counter.

4. The cache memory of claim 2, wherein said miss rate of a set is determined by comparing a number of misses experienced during a given number of accesses.

5. The cache memory of claim 1, further comprising a mapper that transforms a set index identifying a set in said cache memory for a block of main memory to an expanded group of sets including said thrashed set and one or more additional sets.

6. The cache memory of claim 1, wherein said selector identifies said one or more additional frames to augment said thrashed set using an access rate of said additional frames.

7. The cache memory of claim 1, wherein said selector identifies said one or more additional frames to augment said thrashed set using a position in an address space of said additional frames.

8. The cache memory of claim 1, wherein said one or more additional frames are shared with said thrashed set.

9. The cache memory of claim 1, further comprising a mechanism for disassociating said one or more additional sets from said thrashed set when the additional sets are no longer needed to decrease thrashing.

10. A method for reducing thrashing in a cache memory, said method comprising the steps of:
    storing information from main memory in a plurality of sets of cache frames;
    detecting when one or more of said sets are a thrashed set; and
    identifying one or more additional frames from said plurality of sets to augment said thrashed set, wherein said one or more additional frames and said thrashed set are at the same memory hierarchical level as said cache.

11. The method of claim 10, wherein said detecting step further comprises the step of evaluating a miss rate of a set.

12. The method of claim 11, wherein said miss rate is obtained using a miss counter and an access counter.

13. The method of claim 11, wherein said miss rate of a set is determined by comparing a number of misses experienced during a given number of accesses.

14. The method of claim 10, further comprising the step of transforming a set index identifying a set in said cache memory for a block of main memory to an expanded group of sets including said thrashed set and one or more additional sets.

15. The method of claim 10, wherein said identifying step further comprises the step of identifying said one or more additional frames to augment said thrashed set using an access rate of said additional frames.

16. The method of claim 10, wherein said identifying step further comprises the step of identifying said one or more additional frames to augment said thrashed set using a position in an address space of said additional frames.

17. The method of claim 10, wherein said one or more additional frames are shared with said thrashed set.

18. The method of claim 10, further comprising the step of disassociating said one or more additional sets from said thrashed set when said additional sets are no longer needed to decrease thrashing.

19. A cache memory, comprising:
    means for storing information from main memory in a plurality of sets of cache frames;
    means for detecting when one or more of said sets are a thrashed set; and
    means for identifying one or more additional frames from said plurality of sets to augment said thrashed set, wherein said one or more additional frames and said thrashed set are at the same memory hierarchical level as said cache.

20. The cache memory of claim 19, wherein said means for detecting thrashing evaluates a miss rate of a set.

21. The cache memory of claim 20, wherein said means for detecting thrashing further comprises means for counting frame misses counter and frame accesses.

22. The cache memory of claim 20, wherein a miss rate of a set is determined by comparing a number of misses experienced during a given number of accesses.

23. The cache memory of claim 19, further comprising means for transforming a set index identifying a set in said cache memory for a block of main memory to an expanded group of sets including said thrashed set and one or more additional sets.

24. The cache memory of claim 19, wherein said means for identifying identifies said one or more additional frames to augment said thrashed set using an access rate of said additional frames.

25. The cache memory of claim 19, wherein said means for identifying identifies said one or more additional frames to augment said thrashed set using a position in an address space of said additional frames.

26. The cache memory of claim 19, further comprising means for disassociating said one or more additional sets from said thrashed set when the additional sets are no longer needed to decrease thrashing.

27. An integrated circuit, comprising:
a cache memory having a plurality of sets of cache frames for storing information from main memory;
a thrashing detector for determining when one or more of said sets are a thrashed set; and
a selector for identifying one or more additional frames to augment said thrashed set, wherein said one or more additional frames and said thrashed set are at the same memory hierarchical level as said cache.

28. The integrated circuit of claim 27, wherein said thrashing detector evaluates a miss rate of a set.

29. The integrated circuit of claim 27, further comprising a mapper that transforms a set index identifying a set in said cache memory for a block of main memory to an expanded group of sets including said thrashed set and one or more additional sets.

30. The integrated circuit of claim 27, further comprising a mechanism for disassociating said one or more additional sets from said thrashed set when the additional sets are no longer needed to decrease thrashing.

* * * * *

UNITED STATES PATENT AND TRADEMARK OFFICE
CERTIFICATE OF CORRECTION

PATENT NO.    : 6,874,056 B2
DATED         : March 29, 2005
INVENTOR(S)   : Dwyer et al.

It is certified that error appears in the above-identified patent and that said Letters Patent is hereby corrected as shown below:

<u>Title page,</u>
Item [57], ABSTRACT,
Line 2, before "in" and after "cache" replace "trashing" with -- thrashing --.

<u>Column 1,</u>
Line 8 and 59, before "in" and after "cache" replace "trashing" with -- thrashing --.

Signed and Sealed this

Thirteenth Day of September, 2005

JON W. DUDAS
*Director of the United States Patent and Trademark Office*